United States Patent
Huff et al.

[11] Patent Number: 5,915,342
[45] Date of Patent: Jun. 29, 1999

[54] METHOD OF COMPENSATING FOR BOIL-OFF ALCOHOL IN A FLEXIBLE FUELED VEHICLE WITHOUT A PVC SOLENOID

[75] Inventors: Shean Huff; Mark E. Hope, both of Ann Arbor; Mary Joyce, Farmington Hills; Howard W. Krausman, Dexter; Richard K. Moote, Ann Arbor; William D. Rotramel, Plymouth; Gary L. Seitz, Chelsea, all of Mich.

[73] Assignee: DaimlerChrysler Corporation, Auburn Hills, Mich.

[21] Appl. No.: 08/959,696

[22] Filed: Oct. 29, 1997

[51] Int. Cl.$^6$ .................................... F02B 75/12
[52] U.S. Cl. .................... 123/1 A; 123/681; 123/683; 123/686
[58] Field of Search .................... 123/1 A, 681, 123/683, 684, 686, 689, 494

[56] References Cited

U.S. PATENT DOCUMENTS

| | | |
|---|---|---|
| 4,936,278 | 6/1990 | Umeda .................................... 123/683 |
| 5,255,661 | 10/1993 | Nankee, II et al. . |
| 5,335,637 | 8/1994 | Davis et al. . |
| 5,365,917 | 11/1994 | Adams et al. . |
| 5,400,762 | 3/1995 | Fodale et al. . |
| 5,415,145 | 5/1995 | Letcher et al. . |
| 5,435,285 | 7/1995 | Adams et al. . |
| 5,467,755 | 11/1995 | Konrad et al. . |
| 5,497,753 | 3/1996 | Kopera . |
| 5,520,162 | 5/1996 | Rotramel et al. . |
| 5,613,480 | 3/1997 | Katoh et al. ............................. 123/681 |
| 5,730,112 | 3/1998 | Jeong ....................................... 123/681 |

Primary Examiner—John Kwon
Attorney, Agent, or Firm—Mark P. Calcaterra

[57] ABSTRACT

The present invention provides a method of controlling combustion parameters of an internal combustion engine without a PCV solenoid during a boil-off condition. The methodology detects a boil-off condition and implements one of two modes of boil-off compensation depending on the active status of an inferred alcohol content multiplier update system. The methodology also determines the nature of the air-flow through the internal combustion engine and determines the level of boil-off corruption present and the time when the corruption is complete. After the boil-off condition is determined to be complete, control of the combustion parameters are returned to a normal regime of a flexible fuel compensation system using the inferred alcohol content from the employed mode of boil-off compensation.

11 Claims, 2 Drawing Sheets

METHOD OF COMPENSATING FOR BOIL-OFF ALCOHOL IN A FLEXIBLE FUELED VEHICLE WITHOUT A PVC SOLENOID

BACKGROUND OF THE INVENTION

1. Technical Field

The present invention relates generally to fuel control systems and, more particularly, to a method of compensating for boil-off corruption in a motor vehicle capable of operating on more than one type of fuel.

2. Discussion

Environmental and energy independence concerns have stimulated the development of alternative transportation fuels, such as alcohol fuels, for use in automobiles. Alcohol fuels include methanol and ethanol. A flexible fueled vehicle capable of operating on gasoline, or alcohol fuel, or any mixture of the two fuels, is therefore in demand. Modifications to the engine are necessary when operating on different fuels because of the different characteristics of each fuel. For example, an engine operating on ethanol or E85 (a blend of 85% ethanol and 15% gasoline) requires approximately 1.4 times the amount of fuel relative to gasoline at stoichiometry due to a lower energy content of the ethanol.

Air/fuel ratio in internal combustion engine design is typically considered to be the ratio of mass flow rate of air to mass flow rate of fuel inducted by an internal combustion engine to achieve conversion of the fuel into completely oxidized products. The chemically correct ratio corresponding to complete oxidation of the products is called stoichiometric. If the air/fuel ratio is less than stoichiometric, an engine is said to be operating rich, i.e., too much fuel is being burned in proportion to the amount of air to achieve perfect combustion. Likewise, if the air/fuel ratio is greater than stoichiometric, an engine is said to be operating lean, i.e., too much air is being burned in proportion to the amount of fuel to achieve perfect combustion. Alcohol fuels have a lower air/fuel ratio than gasoline at stoichiometric, so that the engine must be compensated for in the rich direction as the percentage of alcohol in the fuel increases.

A flexible fueled vehicle operated in cold ambient conditions experiences a condition referred to in the art as boil-off. When cold starting a vehicle that is fueled with alcohol, some of the injected fuel remains in a liquid state and accumulates in the engine oil. When the oil temperature reaches the boiling point of alcohol, the alcohol therein begins to vaporize and is introduced into the engine through the crank case ventilation system. These vapors can potentially cause a high level of rich fuel corruption until all of the alcohol in the oil is vaporized.

U.S. Pat. No. 5,520,162, entitled "Boil-off for a Flexible Fuel Compensation System", hereby expressly incorporated by a reference, provides a flexible fuel compensation system including a method of methanol-type boil-off compensation. The methanol boil-off compensation method includes an initialization routine, a run mode routine and a shut-down routine. The method monitors a plurality of flags to determine when the methanol boil-off compensation should be used.

Although this and other prior art methods are effective for their particular applications, there is room for improvement in the art. For instance, previously, there was no provision for allowing the percent alcohol content learning system of the motor vehicle to function without being corrupted by the temporary introduction of alcohol vapors into the engine. This corruption causes the fuel content multiplier of the percent alcohol content system to be frozen at an incorrect value. This causes potential drivability deficiencies after the boil-off condition ceases.

Also, if the fuel composition multiplier is determined before the boil-off condition arose, there is no way to compensate for the additional alcohol introduced into the engine during the boil-off period. This also poses the potential for rich drivability deficiencies. Therefore, it would be desirable to provide a temporary fuel composition multiplier for low and high air-flows in the engine for yielding additional fuel control during a boil-off condition and also saving the pre-boil-off fuel composition multiplier value for subsequent use.

SUMMARY OF THE INVENTION

It is, therefore, one object of the present invention to provide a system of flexible fuel compensation.

It is another object of the present invention to provide a flexible fueled compensation system which determines if a boil-off condition will occur during the present vehicle operation.

It is yet another object of the present invention to provide a flexible fuel compensation system that avoids corrupting the fuel composition multiplier of a percent alcohol content learning system during alcohol content learning.

It is still another object of the present invention to provide a flexible fuel compensation system that compensates for different levels of boil-off corruption at high and low air-flows.

It is still yet another object of the present invention to provide a flexible fuel compensation system that allows for enhanced fuel control during a boil-off condition when the fuel composition multiplier of a percent alcohol content learning system was previously learned.

It is also an object of the present invention to provide a flexible fuel compensation system that determines when a boil-off condition is complete.

The above and other objects are provided by a method of compensating for boil-off alcohol in a flexible fueled vehicle without a PCV solenoid. The methodology detects a boil-off condition and updates an inferred ethanol content accordingly. The compensation is correlated with engine air-flow to account for high or low levels of boil-off corruption. The methodology also determines when a boil-off condition has ceased and returns engine combustion parameters to a non boil-off operating mode.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

Figure 1:
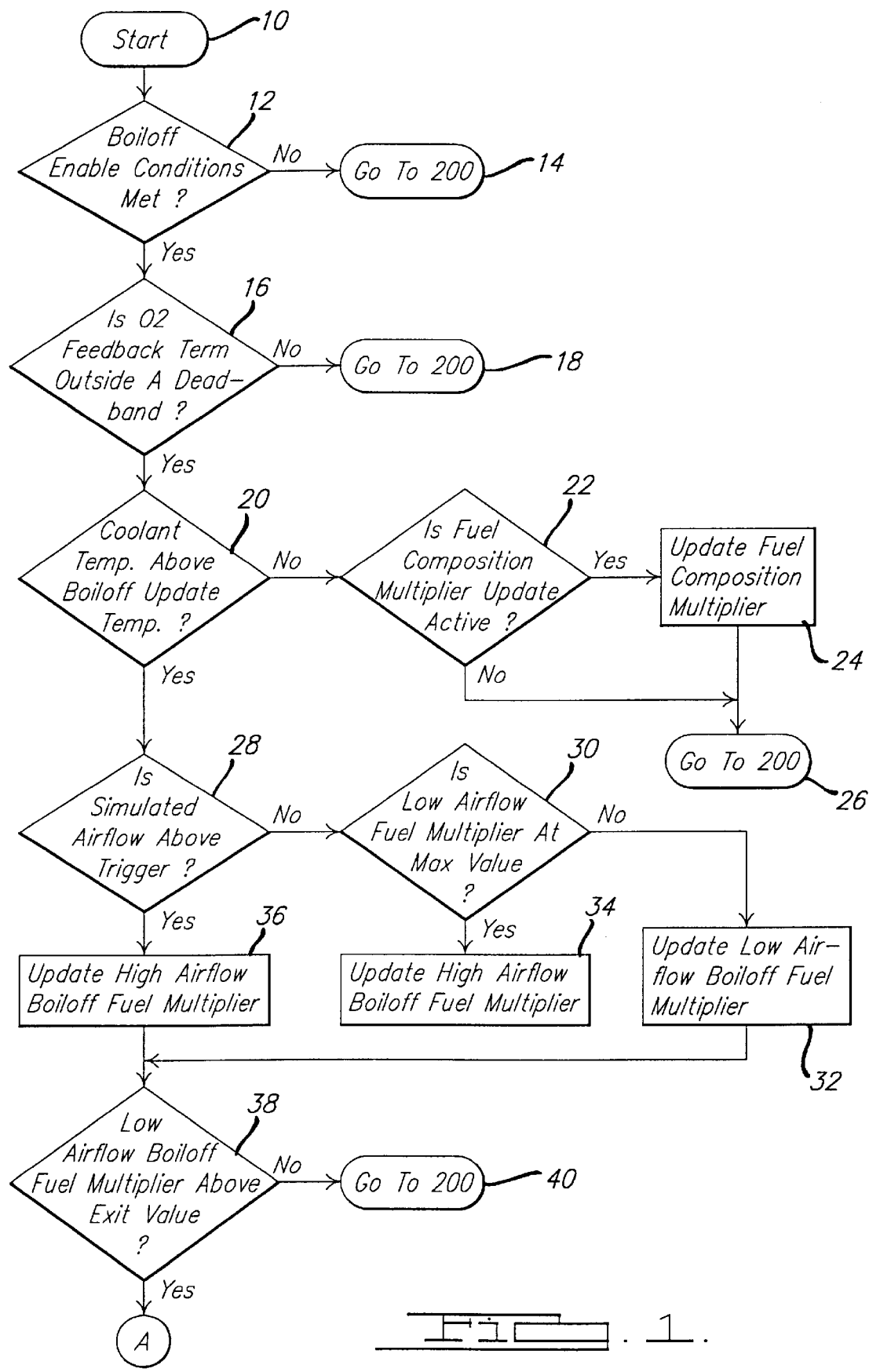
FIGS. 1 and 2 illustrate a flow chart of a method of flexible fuel compensation control for a boil-off condition in a flexible fueled vehicle without a PCV solenoid.

The present invention is directed toward a method of compensating for boil-off alcohol in a flexible fueled vehicle without a PCV solenoid. According to the present invention, greater control of engine fueling parameters is provided during a boil-off condition. Also, the methodology prohibits corruption of the fuel content multiplier determination in a percent alcohol content learning system during a boil-off condition. Additionally, the methodology allows compensation for different levels of boil-off corruption at low and high airflows through the engine. Although the present invention is well suited for operation in conjunction with any number of fuel control systems, a preferred fuel control system is disclosed in U.S. Pat. No. 08/958,411, entitled "Method of Determining a Composition of Fuel in a Flexible Fueled Vehicle" to Nankee II et al. which is incorporated by reference herein.

When cold starting a vehicle that is fueled with ethanol, some of the injected fuel accumulates in the engine oil. This is caused by the inability of charge air to vaporize all of the ethanol at cold operating conditions. Therefore, much of the injected fuel remains in an incombustible liquid state. Additionally, the seal between the rings and the cylinder wall is not strong enough to prevent leakage during cold cranking and cold operation. As such, the liquid fuel runs down the cylinder walls and into the engine oil.

When the oil temperature reaches about 170° F., the boiling point of ethanol, the ethanol begins to vaporize. The vaporized ethanol is introduced into the engine through the crank case ventilation system. The vapors may cause a high level of fuel corruption until all of the ethanol in the oil is vaporized and ingested into the engine.

If unaccounted for, the ethanol boil-off corruption may cause large errors in the inferred percent alcohol content of the fuel. The inferred percent alcohol content of the fuel is the alcohol content typically determined by an oxygen sensor feedback system. In addition to the errors introduced to the inferred alcohol content, the boil-off corruption can also be sufficient enough to cause idle and drivability deficiencies.

The presence of a boil-off condition is detected by monitoring the engine start coolant temperature, the start battery temperature, the number of crank shaft revolutions counted before a start-to-run transfer, and the alcohol content of the fuel during the drive. If the start coolant and battery temperature are below a threshold value, the number of crankshaft revolutions is greater than a second threshold value, and if at any time during the drive the alcohol content exceeds a third threshold value, the boil-off compensation system of the present invention is activated.

Furthermore, in accordance with the present invention, two modes of boil-off compensation are provided. A first mode of boil-off compensation is used if there is an active inferred alcohol content update. A second mode of boil-off compensation is employed if an inferred alcohol content update is not active.

According to the first mode of boil-off compensation (inferred alcohol content update active), the inferred alcohol content is normally updated below a specified temperature which defines the region where boil-off corruption cannot occur. However, once the predetermined coolant threshold temperature is reached, the inferred alcohol content is stored at its current value to a temporary storage location in the memory of the engine control unit. The stored value is updated periodically to compensate for the ethanol boil-off corruption in engine fueling.

In the second mode of boil-off compensation (inferred alcohol update not active), the inferred alcohol content is stored in the memory of the engine control unit when a boil-off condition is detected. However, the stored value is not updated until a specified coolant temperature is reached. In other words, the inferred alcohol content is updated below the specified coolant temperature when the update is active and held when the update is not active. Also, the temporary storage location of the alcohol content that is used to compensate for boil-off is written to the current value when the corruption is complete if the update is active. However, if the update is not active, the current value is not overwritten when boil-off is complete.

The fuel corruption level due to boil-off is inversely proportional to engine airflow. In fact, small amounts of boil-off only corrupt engine operation at low air flows. As such, the level of boil-off corruption present and the time when corruption is complete may be determined. At high engine airflows, the temporary stored inferred alcohol content is updated to account for high levels of boil-off. This value is therefore used as the high airflow modifier for boil-off. At low airflows, the temporary alcohol content is held and used and an additional fuel modifier is updated and used to compensate for the additional corruption. The low airflow modifier is held at high airflows and not used.

As stated above, the difference in corruption between high and low airflows is used to determine when a boil-off condition is complete. That is, if the low airflow modifier indicates a low corruption level, either the high airflow modifier is not properly updated or the boil-off condition is complete. In other words, if the low airflow modifier reaches its maximum value and the feedback fuel control system still calls for an increase in the fueling, there must be an error in the high airflow modifier. In this case, the high airflow modifier is increased at low airflows. To ensure that the high airflow modifier is correct, the boil-off compensation system will not determine that the boil-off condition is complete until the high airflow modifier is reupdated after the low airflow modifier indicates a low level of boil-off. If the low airflow modifier still indicates a low level of boil-off after the high airflow modifier completely updates, an exit timer is started. When the timer expires, the boil-off compensation system of the present invention is complete.

When the boil-off compensation system is complete, if the system is operating in the first mode of boil-off compensation (inferred alcohol content update active), the temporary stored inferred alcohol content is used again for fuel control. The update is then completed as in the case without boil-off. If the boil-off compensation system is operating in the second mode of boil-off compensation (inferred alcohol content update not active), alcohol fuel control is continued based on the inferred alcohol content value from a previous update.

Figure 2:
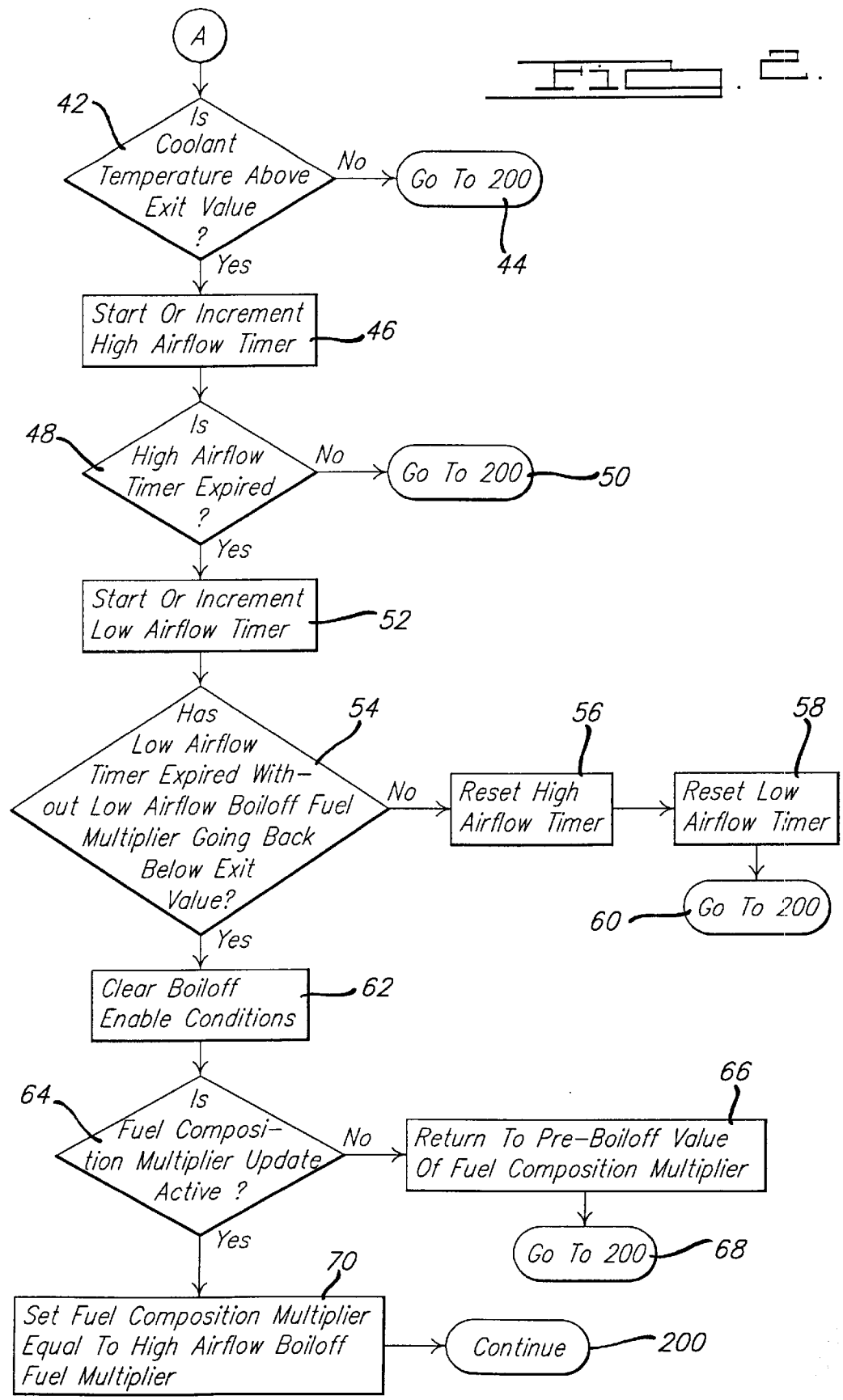

Turning now to the drawing figures, FIGS. 1 and 2 illustrate a flow chart for a method of flexible fuel compensation control of an ethanol boil-off condition in a flexible fueled vehicle without a PCV solenoid. The methodology starts in bubble 10 and advances to decision block 12. In decision block 12, the methodology determines if the boil-off enable conditions (e.g., coolant temperature, battery temperature, etc.) have been met. If not, the methodology advances to bubble 14 where it is forwarded to bubble 200 (FIG. 2) and is returned to start-up bubble 10.

If the boil-off enable conditions are satisfied in decision block 12, the methodology advances to decision block 16. In decision block 16, the methodology determines if the oxygen sensor feedback short term fuel control multiplier is outside of deadband for determining rich or lean operation. If not, the methodology advances to bubble 18 and is forwarded to bubble 200 where it is returned to start-up bubble 10. However, if the oxygen sensor feedback short term fuel control multiplier is outside of deadband at decision block 16, the methodology advances to decision block 20.

In decision block 20, the methodology determines if the engine coolant temperature is above a boil-off update temperature. If not, the methodology advances to decision block 22 and determines if the fuel composition multiplier update is active. If the fuel composition multiplier update is active, the methodology advances to block 24 and updates the fuel composition multiplier. If the fuel composition multiplier update is not active at decision block 22, or if the fuel composition multiplier has been updated at block 24, the methodology advances to bubble 26 and is forwarded to bubble 200 where it is returned to start-up bubble 10.

Referring again to decision block 20, if the coolant temperature is above the boil-off update temperature, the methodology advances to decision block 28. In decision block 28, the methodology determines if the calculated airflow through the engine is above a pre-selected threshold. If not, the methodology advances to decision block 30.

In decision block 30, the methodology determines if the low airflow boil-off fuel multiplier is at its maximum value. If not, the methodology advances to block 32 and updates the low airflow boil-off fuel multiplier. However, if the low airflow boil-off fuel multiplier is at its maximum value at decision 30, the methodology advances to block 34. In block 34, the methodology updates the high airflow boil-off multiplier.

Referring again to decision block 28, if the calculated airflow is above the pre-selected threshold, the methodology advances to block 36. In block 36, the methodology updates the high airflow boil-off fuel multiplier. After the methodology updates the high airflow boil-off fuel multiplier in block 36 or 34, or updates the low airflow boil-off fuel multiplier in block 32, the methodology advances to decision block 38.

In decision block 38, the methodology determines if the low airflow boil-off fuel multiplier is above an exit value. If not, the methodology advances to bubble 40 where it is forwarded to bubble 200 and returned to start-up bubble 10. However, if the low airflow boil-off fuel multiplier is above the exit value, the methodology advances through connector A to decision block 42 (FIG. 2).

In decision block 42 the methodology determines if the coolant temperature is above the exit value. If not, the methodology advances to bubble 44 where it is advanced to bubble 200 and returned to start-up bubble 10. If the coolant temperature is above the exit value at decision block 42, the methodology advances to block 46 and starts or increments a high airflow timer. From block 46, the methodology advances to decision block 48 and determines if the high airflow timer has expired. If not, the methodology advances to bubble 50 where it is forwarded to bubble 200 and returned to start-up bubble 10.

If the high airflow timer has expired at decision block 48, the methodology advances to block 52. In block 52, the methodology starts or increments a low airflow timer. From block 52 the methodology advances to decision block 54 and determines if the low airflow timer has expired without the low airflow blow-off fuel multiplier proceeding below the exit value.

If not, the methodology advances to block 56 and resets the high airflow timer. After resetting the high airflow timer at block 56, the methodology advances to block 58 and resets the low airflow timer. After resetting the low airflow timer at block 58, the methodology advances to bubble 60 where it is forwarded to bubble 200 and returned to start-up bubble 10.

Referring again to decision block 54, if the low airflow timer has expired without the low airflow boil-off fuel multiplier proceeding below the exit value, the methodology advances to block 62. In block 62, the methodology clears the boil-off enable conditions. From block 62, the methodology advances to decision block 64 and determines if the fuel composition multiplier update is active.

If the fuel composition multiplier update is not active at decision block 64 the methodology advances to block 66 and returns the fuel composition multiplier to its pre-boil-off value. From block 66, the methodology advances to bubble 68 where it is forwarded to bubble 200 and returned to start-up bubble 10.

If the fuel composition multiplier update is active at decision block 64, the methodology advances to block 70. In block 70, the methodology sets the fuel composition multiplier equal to the high airflow boil-off fuel multiplier. After setting the fuel composition multiplier equal to the high airflow boil-off fuel multiplier at block 70, the methodology advances to bubble 200 where it is returned to start-up bubble 10.

According to the above, the present invention provides a system for compensating for boil-off corruption in a flexible fueled vehicle. The system employs a first mode of boil-off compensation if an inferred alcohol content multiplier update function is active and a second mode of boil-off compensation if the inferred alcohol content multiplier update function is inactive. The system also employs different routines for compensating for boil-off corruption at high and low airflows.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of controlling combustion parameters of an internal combustion engine in a flexible fueled vehicle without a PCV solenoid during an alcohol boil-off condition comprising:

detecting a boil-off condition;

detecting an active/inactive status of an inferred alcohol content update system;

implementing a first mode of boil-off compensation if said inferred alcohol content update is active;

implementing a second mode of boil-off compensation if said inferred alcohol content update is inactive;

detecting a high/low nature of an airflow through said internal combustion engine;

setting said combustion parameters for compensating for boil-off corruption according to a first routine based on one of said first and second modes at high engine airflows;

setting said combustion parameters for compensating for boil-off corruption according to a second routine based on one of said first and second modes at low engine airflows;

detecting when said boil-off condition is complete; and returning said control of said combustion parameters to an oxygen sensor feedback based flexible fuel compensation system according to one of said first and second modes of boil-off compensation after said boil-off condition is complete.

2. The method of claim 1 wherein said first mode of boil-off compensation further comprises:

updating an inferred alcohol content value below a specified coolant temperature when said boil-off condition is detected;

holding said inferred alcohol content value at a current value when said specified coolant temperature is reached;

storing said inferred alcohol content value to a temporary storage location; and updating said temporary storage location at high airflows to compensate said combustion parameters for alcohol boil-off corruption after a specified coolant temperature is reached.

3. The method of claim 2 wherein said specified coolant temperature defines a region where boil-off corruption does not occur.

4. The method of claim 1 wherein said second mode of boil-off compensation further comprises:

holding an inferred alcohol content value at a current value when said boil-off condition is detected;

storing said inferred alcohol content value to a temporary storage location; and updating said temporary storage location at high airflows after a specified coolant temperature is reached to compensate said combustion parameters for alcohol boil-off corruption.

5. The method of claim 4 wherein said specified coolant temperature defines a region where boil-off corruption cannot occur.

6. The method of claim 1 wherein said step of returning control of said engine operating parameters to said flexible fuel compensation system further comprises using said updated inferred alcohol content for fuel control if said methodology is operating in said first mode of boil-off compensation and basing said fuel control on said inferred alcohol content value from a previous update if said methodology is operating in said second mode of boil-off compensation.

7. The method of claim 1 wherein said step of detecting a boil-off condition further comprises:

determining if a start coolant temperature of said internal combustion engine is greater than a known value;

determining if a start battery temperature of said vehicle is greater than said known value;

determining if the number of crankshaft revolutions counted before a start-to-run transfer is made in said vehicle is greater than a second known value; and determining if a percent alcohol content of fuel during a drive of said vehicle is greater than a third known value.

8. The method of claim 1 wherein said step of determining when said boil-off condition is complete corresponds to a difference in boil-off corruption between said high and low airflows.

9. The method of claim 1 further comprising determining an amount of said boil-off corruption based on said nature of air-flow through said internal combustion engine.

10. The method of claim 1 further comprising updating said inferred alcohol content at high engine airflows to account for high levels of boil-off and updating and employing an additional fuel modifier to compensate for additional corruption experienced at low air-flows.

11. The method of claim 1 further comprising starting an exit timer and recognizing the expiration of said exit timer as the completion of said boil-off condition if a high airflow modifier is completely updated and if a low airflow modifier still indicates a low level of boil-off.

* * * * *